US010681214B1

(12) United States Patent
Serero et al.

(10) Patent No.: US 10,681,214 B1
(45) Date of Patent: Jun. 9, 2020

(54) ENHANCED REAL-TIME ROUTING

(71) Applicant: Avaya Inc., Santa Clara, CA (US)

(72) Inventors: Eyal Serero, Givataim (IL); Gal Netanel, kfar sava (IL); Ronen Bar-Yoav, Geulim (IL); Roman Nekrashevich, Rishon Lezion (IL); Tamar Barzuza, Tel Aviv (IL)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/233,516

(22) Filed: Dec. 27, 2018

(51) Int. Cl.
H04M 3/523 (2006.01)
G06Q 10/06 (2012.01)
H04M 3/51 (2006.01)

(52) U.S. Cl.
CPC .. H04M 3/5232 (2013.01); G06Q 10/063114 (2013.01); H04M 3/5183 (2013.01)

(58) Field of Classification Search
CPC ............ H04M 3/5232; H04M 3/5183; G06Q 10/063114
USPC ............ 379/265.02, 265.01, 265.05, 265.11, 379/265.12
See application file for complete search history.

(56) References Cited

U.S. PATENT DOCUMENTS

| 6,044,355 | A | 3/2000 | Crockett et al. |
| 6,970,829 | B1 | 11/2005 | Leamon |
| 7,027,621 | B1 | 4/2006 | Prokoski |
| 8,180,043 | B2 * | 5/2012 | Dezonno ............. H04M 3/5232 379/265.11 |
| 8,458,465 | B1 | 6/2013 | Stern et al. |
| 8,634,543 | B2 | 1/2014 | Flockhart et al. |
| 8,670,551 | B2 | 3/2014 | Birk et al. |
| 8,964,958 | B2 | 2/2015 | Steiner |
| 2002/0174380 | A1 | 11/2002 | Mannarsamy |
| 2003/0033145 | A1 | 2/2003 | Petrushin |
| 2003/0167153 | A1 | 9/2003 | Alexander |
| 2005/0148894 | A1 | 7/2005 | Misczynski et al. |
| 2007/0092114 | A1 | 4/2007 | Ritter et al. |
| 2007/0100595 | A1 | 5/2007 | Earles et al. |
| 2007/0121824 | A1 | 5/2007 | Agapi et al. |
| 2007/0146116 | A1 | 6/2007 | Kimbrell |
| 2007/0198850 | A1 | 8/2007 | Martin et al. |
| 2008/0097550 | A1 | 4/2008 | Dicks et al. |
| 2008/0147470 | A1 | 6/2008 | Johri et al. |
| 2009/0023422 | A1 | 1/2009 | MacInnis et al. |
| 2009/0274292 | A1 * | 11/2009 | Diethorn ............. H04M 3/5232 379/265.11 |

(Continued)

Primary Examiner — Thjuan K Addy
(74) Attorney, Agent, or Firm — Sheridan Ross P.C.

(57) ABSTRACT

Contact centers often seek to provide the most effective agents for a particular communication. A communication may comprise a customer node and an agent node. In addition to selecting the particular agent node based on a skill of the agent or other static information, dynamic information may be received and processed to make a routing decision. For example, one agent may be presently located in a noisy area and a communication may be impeded by routing a call to a node associated with an agent in a noisy environment and a different agent node selected. Other dynamic inputs may include determining an agent's proximity to a resource likely required in order to successfully satisfy a purpose of the communication. Additionally, self-learning may be utilized in order to predict when a particular environmental factor is about to change and make routing decisions accordingly.

20 Claims, 5 Drawing Sheets

(56) References Cited

U.S. PATENT DOCUMENTS

| | | |
|---|---|---|
| 2010/0033303 A1 | 2/2010 | Dugan et al. |
| 2010/0054453 A1 | 3/2010 | Stewart |
| 2010/0108425 A1 | 5/2010 | Crespo et al. |
| 2010/0235218 A1 | 9/2010 | Erhart et al. |
| 2011/0125793 A1 | 5/2011 | Erhart et al. |
| 2011/0125826 A1 | 5/2011 | Erhart et al. |
| 2011/0169603 A1 | 7/2011 | Fithian et al. |
| 2011/0295392 A1 | 12/2011 | Cunnington et al. |
| 2012/0010488 A1 | 1/2012 | Henry et al. |
| 2012/0235819 A1 | 9/2012 | Watkins et al. |
| 2012/0316456 A1 | 12/2012 | Rahman et al. |
| 2013/0136250 A1 | 5/2013 | Saushkin |
| 2014/0140495 A1 | 5/2014 | Ristock et al. |
| 2014/0147018 A1 | 5/2014 | Argue et al. |
| 2014/0173078 A1 | 6/2014 | McCord et al. |
| 2014/0200941 A1 | 7/2014 | McDaniel et al. |
| 2014/0206323 A1 | 7/2014 | Scorcioni |
| 2014/0240130 A1 | 8/2014 | Xiong et al. |
| 2014/0278139 A1 | 9/2014 | Hong et al. |
| 2014/0334619 A1 | 11/2014 | Placiakis et al. |
| 2014/0376703 A1 | 12/2014 | Timem et al. |
| 2014/0378777 A1 | 12/2014 | Conrad et al. |
| 2015/0123766 A1 | 5/2015 | St. John |
| 2015/0173633 A1 | 6/2015 | Shimizu et al. |
| 2015/0206090 A1 | 7/2015 | Pakhchanyan et al. |
| 2015/0213800 A1 | 7/2015 | Krishnan et al. |
| 2015/0246673 A1 | 9/2015 | Tseng et al. |
| 2015/0271329 A1 | 9/2015 | Deshmukh et al. |
| 2016/0036983 A1 | 2/2016 | Korolev et al. |
| 2016/0071393 A1 | 3/2016 | Kaplan et al. |
| 2016/0191712 A1 | 6/2016 | Bouzid et al. |
| 2016/0286047 A1 | 9/2016 | Matula et al. |
| 2016/0379153 A1 | 12/2016 | Matula et al. |

\* cited by examiner

ENHANCED REAL-TIME ROUTING

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communication management in a network of nodes and particularly for selecting and connecting a particular node in a network for a communication session.

BACKGROUND

Communications networks, such as those utilized by contact centers may use a great deal of information for routing communications to a particular node. A user may call and interface with an Interactive Voice Response (IVR) or a conversational "bot" to initiate a request. The request may give insight to the service the user needs which can then be used for routing purposes.

SUMMARY

These and other needs are addressed by the various embodiments and configurations of the present invention. The present invention can provide a number of advantages depending on the particular configuration. These and other advantages will be apparent from the disclosure of the invention(s) contained herein.

System and method operable to change contact center routing based on dynamic attributes of contact center agents and real-time environmental assessments. This solution is significantly more flexible and valuable for contact centers by considering and processing additional skills, attributes, and states than have previously been considered.

Inputs, such as from networked sensors can be used to determine contemporary attributes of a contact center agent, such as those that are highly variable and may change minute by minute or, in some embodiments, faster. Attributes of the contact center agent may change at any given time. The contact center agent may also be in a changing environment that optimally should be considered. Predefined skills (e.g., language) that are hard skills will not change, but other agent state (e.g., relaxed, anxious, sick) and environmental state conditions (e.g., noisy) are subject to change.

In an Internet-of-things (IoT) world, the contact center may be provided with additional information such as agent and/or environmental state conditions and attributes, as well as hard, non-dynamic skills. The contact center can react to dynamically changing attributes and availability and change the way optimal routing is delivered.

For example, the contact center agent may be sitting in a noisy environment. If there is a lot going on around the contact center agent and there is an inordinate amount of noise in his surrounding, the contact center agent may be less desirable to take a call than a contact center agent in a quiet environment. Additionally, knowing that another agent having extra knowledge is nearby may also be helpful. For example, if a manager is in the proximity of the contact center agent, that contact center agent may be more desirable to take a call that is, or is likely, to require a manager's input as compared to an agent that is alone. The agent might be able to provide better service if he has someone nearby to ask questions, ask for clarification, and who can provide complementary information. In another example, the contact center agent may be chosen if he has certain equipment on his desk, in his hand, or nearby. The system can also determine which equipment is in use. A sensor can provide device location and availability and be able to choose the best contact center agent accordingly. It might be noisier next to a printer than by a window for a time, and routing can be adjusted temporarily. The health of the contact center agent (e.g., happy, anxious, sick, etc.) may also be taken into account for dynamic routing, in addition to indicators to his health condition (pulse, blood pressure, temperature, etc.).

In one embodiment, communications are received and annotated with attributes which may comprise a portion of static attributes (e.g., a purpose for calling as indicated by the user) or dynamic attributes (e.g., the current or recent value reported by a sensor or monitor). In another embodiment, agents in a contact center may be associated with a record that similarly comprises static information that, at least during the time of a work shift does not change (e.g., languages spoken, expertise with a particular product, etc.), as well as dynamic information (e.g., current noise level, proximity to a subject matter expert or manager, etc.). Then, a routing system may route a call or other communication to an agent that is better matched with a purpose for a communication at that time. For example, a customer wishing to perform an operation that either is known to, or reasonably believed to, require a manager's approval may be routed to an agent who is currently proximate to a supervisor walking the floor of a contact center having a number of agents.

In one embodiment, a system is disclosed, comprising: a network interface to a network; a microprocessor; and wherein the microprocessor: receives a communication attribute associated with a communication, the communication attribute being associated with the purpose of the communication; receives an agent environmental attribute; selects an agent from a pool of agents, the selected agent either having the agent environmental attribute, when the microprocessor determines the agent environmental attribute is beneficial to the communication attribute, or does not have the agent environmental attribute, when the microprocessor determines the agent environmental attribute is detrimental to the communication attribute; and causes the communication to be routed to a communication device associated with the selected agent.

In another embodiment, a method is disclosed, comprising: receiving a communication attribute associated with a communication over a network, the communication attribute being associated with the purpose of the communication; receiving an agent environmental attribute; selecting an agent from a pool of agents, the selected agent either having the agent environmental attribute, when the microprocessor determines the agent environmental attribute is beneficial to the communication attribute, or does not have the agent environmental attribute, when the microprocessor determines the agent environmental attribute is detrimental to the communication attribute; and causing the communication to be routed to a communication device associated with the selected agent.

In another embodiment, a computer-readable medium comprising instructions is disclosed that, when read by a microprocessor, cause the microprocessor to perform:

receiving a communication attribute associated with a communication over a network, the communication attribute being associated with the purpose of the communication; receiving an agent environmental attribute; selecting an agent from a pool of agents, the selected agent either having the agent environmental attribute, when the microprocessor determines the agent environmental attribute is beneficial to the communication attribute, or does not have the agent environmental attribute, when the microprocessor determines the agent environmental attribute is detrimental to the communication attribute; and causing the communication to be routed to a communication device associated with the selected agent.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C. Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
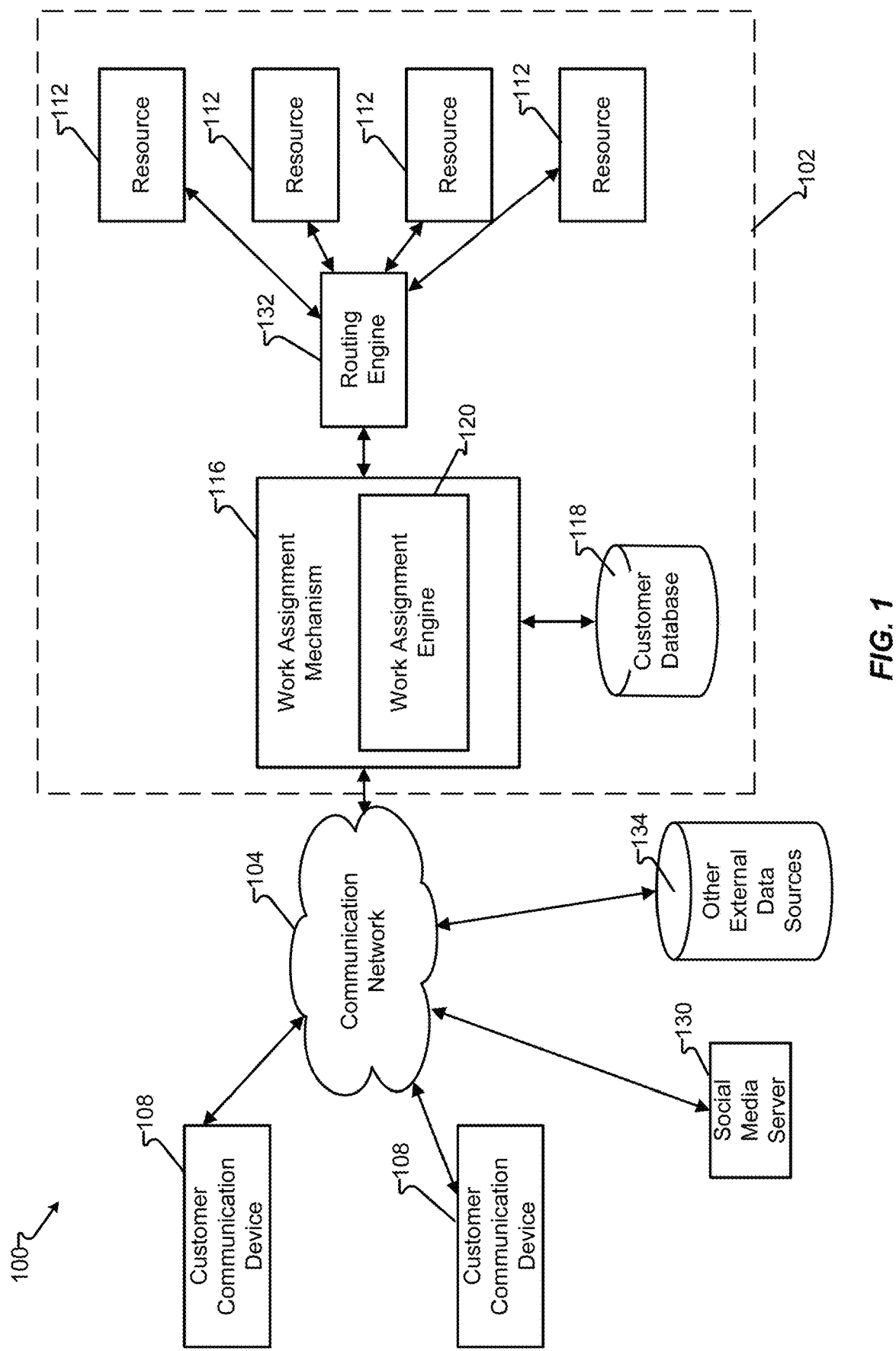
FIG. 1 depicts a system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or as a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
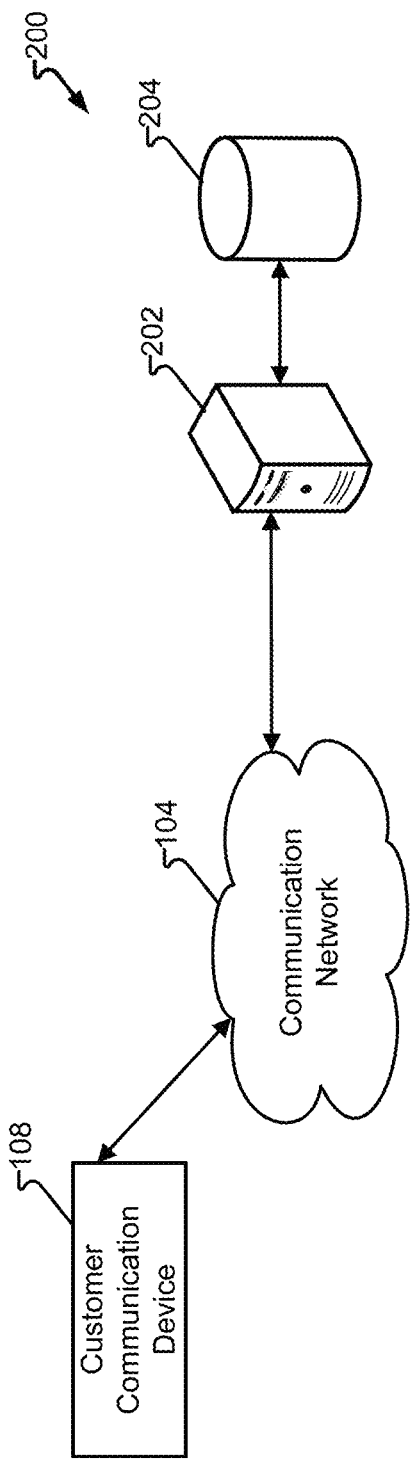
FIG. 2 depicts a portion of a system in accordance with embodiments of the present disclosure.

FIG. 2 depicts portion 200 of a system in accordance with embodiments of the present disclosure. In one embodiment, portion 200 comprises a portion of system 100. In a further embodiment, portion 200 may comprise components that are in addition or alternative to those provided by system 100. In one embodiment, a customer utilizing customer communication device 108 contacts contact center 102 to initiate a communication having a particular purpose. The communication is initially received at automated node 202 which may comprise an automated or interactive voice response system, selectable menu items, etc. which may allow automated node 202 to determine the purpose or category of purposes. Automated node 202 may also determine a purpose, or category thereof, from information such as number calling from—such as when caller identification information is known to system 100 and/or portion 200, which may be determined from as an entry in customer database 118 and/or other data storage. Customer communication device 108, when embodied as a telephone, may have called contact center 102 utilizing a particular number associated with the purpose (e.g., for reservations call 800.000.0001, for flight status call 800.000.0002, for questions about your bill call 800.000.0003, etc.). Customer communication device 108, when embodied as a text-based communication device (e.g., email, texting, etc.) may have initiated a communication with a particular address associated with the purpose (e.g., for reservations email reservations@airline.com, for flight status email status@airline.com, for questions about your bill email billing@airline.com, etc.). In another embodiment, the communication may be imitated from contact center 102, such as from automated node 202, wherein the purpose may be known in advance of initiating the communication to customer communication device 108.

In addition or alternative to the foregoing, the purpose of the communication may become known, such as by matching a portion of the communication to at least one record in data storage 204, the matching record associating content of a communication with a collection of purposes. For example, a customer utilizing customer communication device 108 may speak or type a word (e.g., "account," "reservation," etc.) or phase (e.g., "question about my bill," "book a flight to," etc.) that is determined to match a particular purpose record, such as one or more records 300 (see FIG. 3). It should be appreciated that data storage 204 may comprise a media storage device (e.g., magnetic tape/disk, optical disk, solid state, etc.) and/or a single storage device or a plurality of storage appliances which may be co-located with contact center 102 and/or in one or more other locations, including portions of a number of physical devices (e.g., storage farm, storage cloud, networked storage, etc.), processor (such as one or more microprocessors of server 202) memory, device memory, or any two or more of the foregoing.

In another embodiment, determining the purpose may be omitted from consideration, such as when contact center 102 is entirely directed to a single purpose. Additionally or alternatively, the purpose may be generalized, such as one associated with the modality of the communication via communication network 104, for example, to obtain or provide information via a voice call, to have an email exchange, etc.

Figure 3:
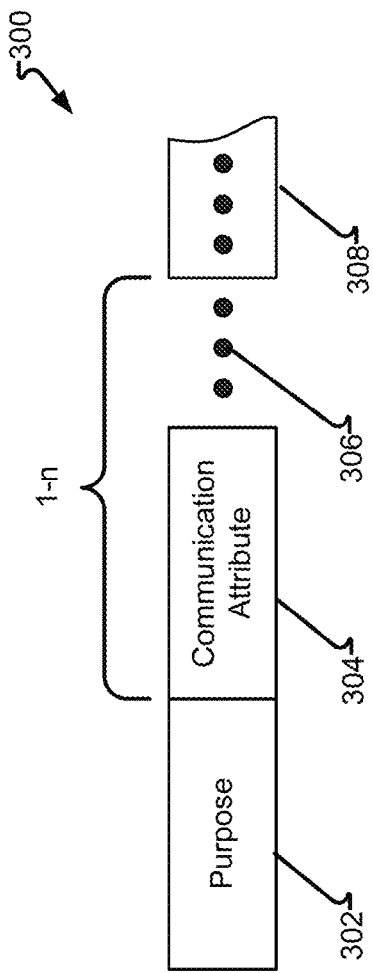
FIG. 3 depicts a first record in accordance with embodiments of the present disclosure.

FIG. 3 depicts record 300 in accordance with embodiments of the present disclosure. In one embodiment, record 300 comprises a number of entries which may include purpose 302 and one or more communication attribute 304 and, optionally, one or more additional entry 306 associated with communication attribute 304. For example, communication attribute 304 may indicate the call is a voice call and additional entry 306 may indicate the quality of the connection, such that a voice call having a poor quality of connection may be routed to an agent currently experiencing a quieter environment, whereas if the quality is sufficiently good, the noise level a particular agent is experiencing may be irrelevant. In another embodiment, one or more communication attributes 304 each having zero or more additional entries 306, is provided. Communication attribute 304 may describe a modality (e.g., voice, text, etc.), urgency, high-value customer, language spoken, subject matter, etc. While communication attributes 304 may indicate a need associated with a static attribute of an agent (e.g., knowledge of a particular product, language fluency, etc.), for purposes of the embodiments provided herein, such attributes may be handled by routing decisions known in the art. Accordingly, a pool of agents is available and has sufficient static attributes (e.g., language skills, product knowledge, etc.) to accept communication and successfully satisfy the purpose of the communication, however, due to dynamic attributes, such as those associated with a mobile resource or an environmental state, one agent may be selected over another agent be connected, via resource 112 when embodied as an agent communication device, to be the node connected to the node of the customer, e.g., customer communication device 108. In another embodiment, zero or more supplemental entries 308 may be provided for any particular instantiation of record 300, such as to provide a description, index, alternative forms of a particular purpose, for example, "billing question," "account issue," "why was I charged for . . . ", may be associated with the same instance of record 300 associated with accounting issues.

Figure 4:
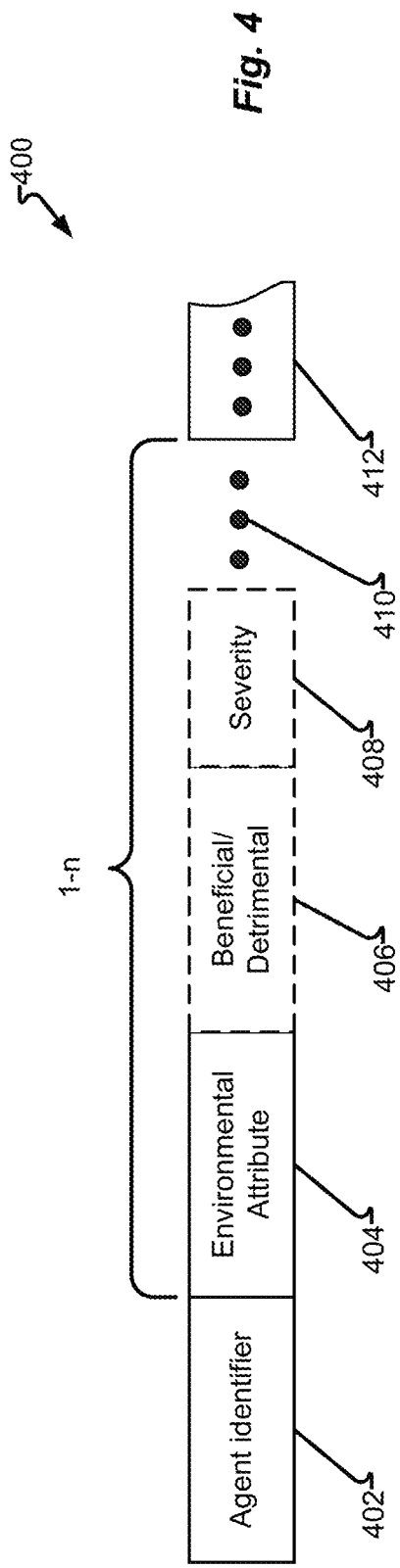
FIG. 4 depicts a second record in accordance with embodiments of the present disclosure.

FIG. 4 depicts record 400 in accordance with embodiments of the present disclosure. In one embodiment, record 400 is one record 400 of a plurality of records 400, such as may be stored in data storage 204 and/or other data storage accessible to a processor utilized to make routing decisions, such as one or more microprocessors of routing engine 132, work assignment mechanism 116, work assignment engine 120, other computer(s)/server(s), or any combination of two or more of the foregoing.

In one embodiment, record 400 comprises a number of entries which may include, agent identifier 402. Agent identifier 402 may identify an agent by name, employee number, location, and/or other attribute that enables one agent to be identified among a pool of agents. One of record 400 may comprise one or more entries comprising environmental attribute 404, optionally beneficial/detrimental indicator 406, optionally severity indicator 408, and optionally additional records 408. Environmental attribute 404 may be populated with current environmental conditions associated with an agent identified in agent identifier 402. Environmental attribute may be populated from the output of one or more sensing components (see, FIG. 5, refs. 504A-E) to indicate the presence or absence of a resource, a noise level, or other currently observed and transient aspect of the work setting of the agent.

Optional beneficial/detrimental indicator 406 may be utilized to indicate if a particular environmental attribute 404 is a benefit, either in general (e.g., quite) or with respect to a particular purpose 302 (e.g., in close proximity to a resource) or if a particular attribute is a detriment, either in general (e.g., noisy) or with respect to a particular purpose 302 (e.g., will require a supervisors authorization but the supervisor is currently beyond a previously determine threshold necessary to reach the agent in a timely manner). Optional severity indicator may provide a granularity beyond having/not having environmental attribute 404. For example, environmental attribute 404 may indicate a noisy work environment while severity indicator 408 provides a graduation of the level of noise. As a benefit, an agent may be selected having a value of severity indicator 408 that is the greatest, for a beneficial attribute, or the least, for a detrimental attribute, when compared to other agents. Additional entries 410 may be associated with a particular environmental attribute 404 and/or additional entries 412 may be associated with a particular agent identifier. It should be appreciated that other implementations maybe utilized without departing from the scope of the embodiments provided herein. For example, beneficial/detrimental indicator 404 and/or severity indicator 408 may be combined into environmental attribute 404 (e.g., "Unacceptably noisy for voice calls," "Non-voice communications only," etc.). Additionally or alternatively, other record schemas maybe utilized, such as a table having environmental attributes and agents that are currently experiencing those particular attributes, for example, "Sufficiently quite for voice calls"—Agent 5, Agent 6, Agent 12."

Figure 5:
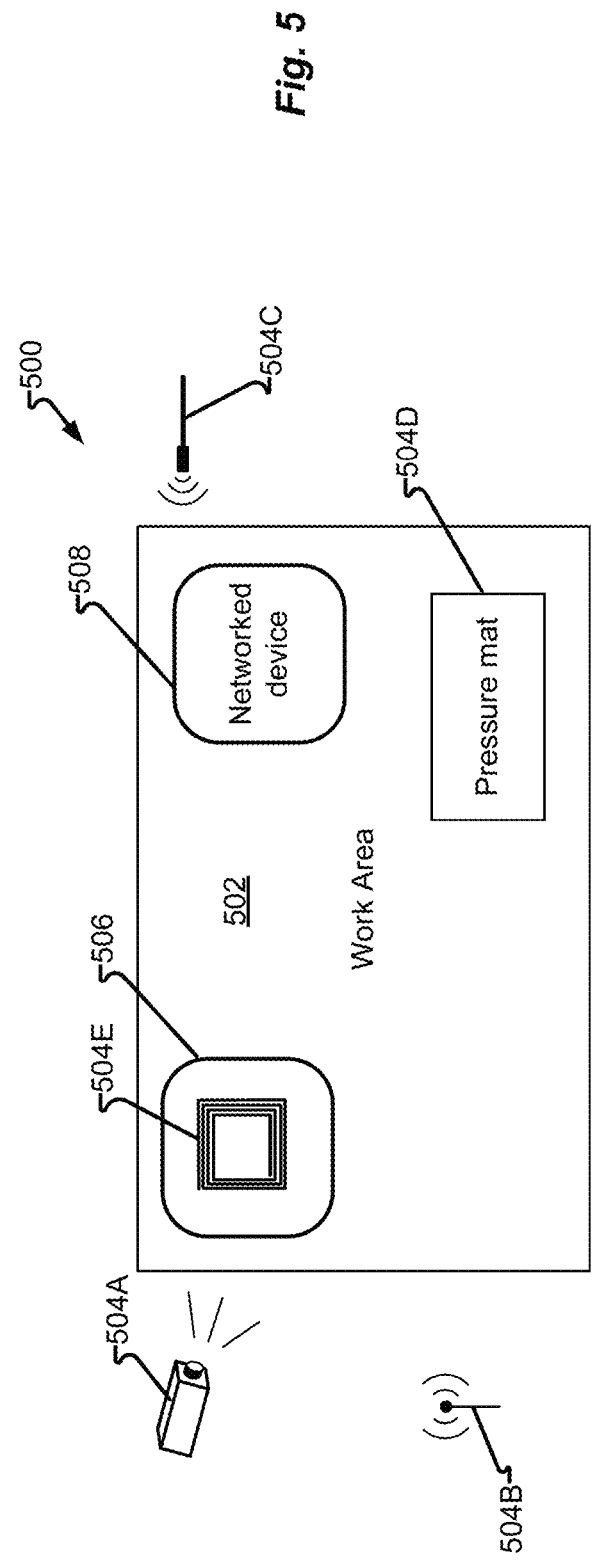
FIG. 5 depicts a first plan view of sensors in a work area in accordance with embodiments of the present disclosure.

FIG. 5 depicts plan view 500 of sensors 504 in work area 502 in accordance with embodiments of the present disclosure. In one embodiment, the current state of work area 500, or a portion thereof, is provided via an output signal form one or more sensor 504 to a network (not shown for clarity) to a processor, such as a microprocessor of server 202 and/or other computer/server. Sensors 504 may be variously embodied and comprise camera 504A, which may receive imaging data of work area 502. The imaging data may be in the visible spectrum or non-visible portion of the electromagnetic spectrum. Antenna 504B may passively and/or actively receive positioning information from a component, such as mobile resource 506 having thereon a radio frequency identifier tag (RFID) 504E that, when proximate to antenna 504B reports the location of mobile resource 506. Pressure mat 504D determines when an object is present thereon. The object may be a resource, such as a supervisor, or a device utilized for at least some communications. Microphone 504C detects acoustic signals in work area 502, such as sound level and/or type, such as human conversations, a device (e.g., machine), pitch, intermittent (e.g., beeps), increasing/steady/decreasing, etc. It should be appreciated that multiple sensors 504, whether homogeneous or heterogeneous, may be utilized to monitor work area 502. It should also be appreciated that other embodiments of sensor 504 may be utilized that detect environmental conditions of work area 502, or a portion thereof, which may include and one or more sensors that observe visual, non-visible (e.g., infrared, ultraviolet, etc.), mechanical (audio, vibration, etc.), location, position, orientation, proximity, or other transient factor or combination thereof and output a signal to a microprocessor, via a network, accordingly.

In another embodiment, components of a network, such as network device 508 may indicate an environmental attribute observed by network device 508 and/or caused by network device 508. For example, network device 508 may be a networked machine that produces significant amount of noise or a type of noise (e.g., high pitch) that hinders an agents ability to hear or be understood when engaged in a voice communication.

In yet another embodiment, at least one sensor 504 alone or with benefit of a microprocessor executing instructions, may know or learn to anticipate a change in an environmental condition. For example, a microprocessor may determine a pattern occurs at regular intervals, such as microphone 504C reporting an increase in noise level. Such regular events may be associated with on-site personnel taking regularly scheduled breaks, beginning/ending of work shifts, the time-triggered operation of equipment, etc. The microprocessor may then anticipate the increase in noise and respond accordingly, such as to avoid routing voice calls to agents in areas affected by the increased noise.

Sensors 504 may also receive cues as to a change in environmental condition for work area 502 or a portion thereof. For example, camera 504A may observe a light, stack light, display, or other indicator of a machine that indicates the machine is preparing to begin an operation. If the machine is known to impact the environmental condition, such as due the noise created, the microprocessor may anticipate an increase in noise upon activation of the cue (e.g., light, stack light, display, etc.) and respond accordingly. Similarly, a networked component, such a switch, hub, or router, may observe an increase in data traffic to a device, such as networked device 508. As a result, the microprocessor may know or determine that such an increase in traffic is a precursor to the networked device 508 beginning (or continuing) operations and respond accordingly in anticipation thereof. Similarly, the microprocessor may determine that a particular event observed by any one or more sensors 504 may cause a predictable, but non-instant, change in environmental conditions and respond to routing communications according to when such environmental conditions will change. For example, if a particular output of one sensor 504 precedes a historic increase in noise level for a particular work area 502, or portion thereof, by five minutes, and most voice call lasts, three minutes, then the microprocessor may continue to route voice calls to communication devices associated with agents in the to-be-affected area for two minutes following receiving the output. As a result, voice calls will be completed, or nearly so, when the increase in noise level actually occurs.

Figure 6:
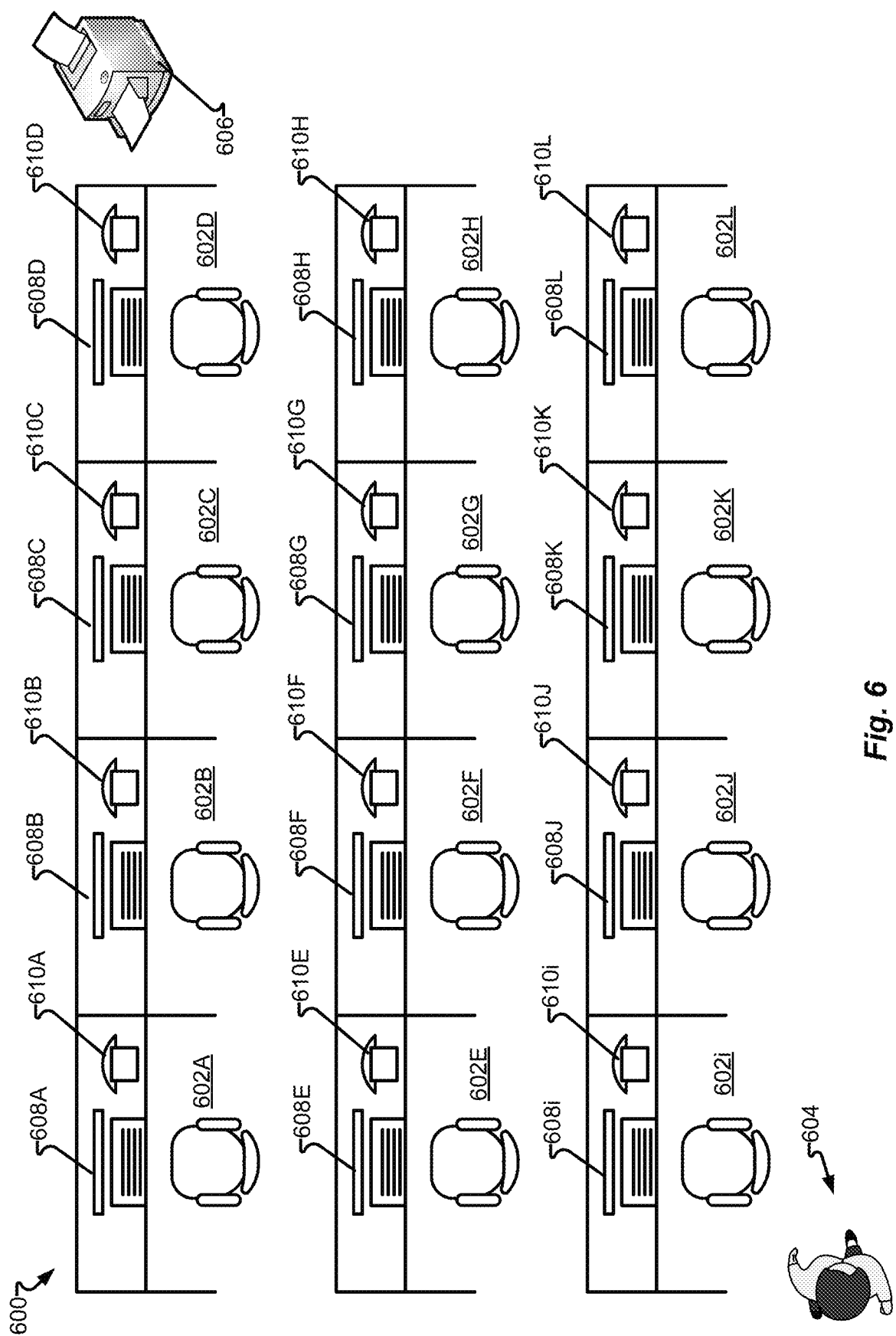
FIG. 6 depicts a second plan view of a work area in accordance with embodiments of the present disclosure.

FIG. 6 depicts plan view of work area 600 in accordance with embodiments of the present disclosure. Work stations 602A-L are utilized by agents to interact with communications nodes 608, 610. Communication nodes 608 may be embodied as a computer terminal connected to, and forming a node on, communication network 104 for voice, video, text, email, and/or other communication modalities. Communication nodes 610 may be embodied as a voice telephone connected to either a packet-switched network, such as plain old telephone system (POTS) and/or a voice over Internet protocol (VoIP) for voice-based communications. Although computer terminals may be configured to be nodes on voice-based communications and telephones may be configured to be non-voice-based communications (e.g., text, video), to avoid unnecessarily complicating the figures and description, embodiments are described wherein communication nodes 608, when embodied as a computer terminal, are utilized for non-voice communications whereas communications nodes 610, when embodied as a telephone, are utilized for voice-based communications. Also, lowercase "i" is used (602i, 608i, 610i) merely to avoid potential confusion with the number "1" that may occur had uppercase "I" been used.

In another embodiment, machine 606 may be a resource utilized to address a purpose of a communication, a source of an environmental condition (e.g., noise), or both. Machine 606 may be stationary, at least within the timeframe of a work shift or, if relocated, is done so infrequently and considered fix once placed in the new location, or mobile, such as may vary in location within work area 600 within a single work shift or continually (e.g., carried by a person).

When machine 606 operates, or operates in a particular mode, an environmental condition may occur, such as noise, vibration, etc. that impair an agent in proximity to machine 606 to conduct certain communications, such as voice and/or video communications. Accordingly, upon detecting the operation of machine 606, a microprocessor, such as of a server executing routing engine 132 may determine that agents at work station 602D should not be routed voice communications. If the noise level is sufficient, additional agents, such as those at work stations 602C, 602G, and 602H may also be omitted from consideration for voice communications.

As described with respect to FIG. 5, the microprocessor may anticipate the occurrence of the environmental condition upon at least one sensor 504 observing and reporting to the microprocessor, a cue, such as the illumination of a particular stack light, an increase in data traffic, etc., and discontinue routing voice calls upon the determination that such voice calls will likely occur or be ongoing when the noise level increases.

In another embodiment, resource 604 may be a mobile resource, such as a supervisor, portable office equipment, etc., that is utilized to satisfy at least some communications, such as those having a purpose requiring a supervisor's approval. Accordingly, routing engine 132 may receive a communication from customer communication device 108 and, based on connection with an initial node, such automated node 202 determine that utilization of resource 604 may be required to satisfy the purpose of the communication. Accordingly, routing engine 132 may select an agent at a workstation proximate to portable resource 604, such as workstation 602*i*, 602J, 602K, 602E. It should be appreciated that work area 600 may be of a different scale, such as involving a large number of workstations 602 in one, or several, different rooms, floors, buildings, or other areas where travel between workstation 602 is a non-trivial event. As a result, selecting a particular workstation 602, able to conduct the communication on a communication node 608/610 and proximate to portable resource 604, may be essential for timely processing the communication and satisfying the purpose.

In another embodiment, agents and their respective communication node 608/610 may be operable to accept different modalities of communications. Accordingly, in the absence of routing of communications, having a particular communication attribute 304, to an agent having a detrimental environmental attribute 404 (or absence of a favorable environmental attribute 404), may be prioritized for receiving communications absent the particular communication attribute 304. For example, communication node 610D may be avoided for voice communications due to the operation of machine 606 producing noise (or at least an unacceptable level or type of noise) and prioritized over other agents, such as those a greater distance from machine 606 (e.g., communication nodes 610*i*, 610E, 610J), for non-voice communications, such as to be connected to have a communication having communication attribute 304 indicating a text-based communication. As a result, a quieter portions of work area 600 maybe connected via their respective communication nodes (e.g., communication nodes 610*i*, 610E, 610J) for voice communications (e.g., having environmental attribute 404 associated with quite or not associated with noise) while text-based communications prioritized to more proximate workstations 602C, 602D, 602H (e.g., via routing to communication nodes 608C, 608D, 608H) for text-based communications.

Figure 7:
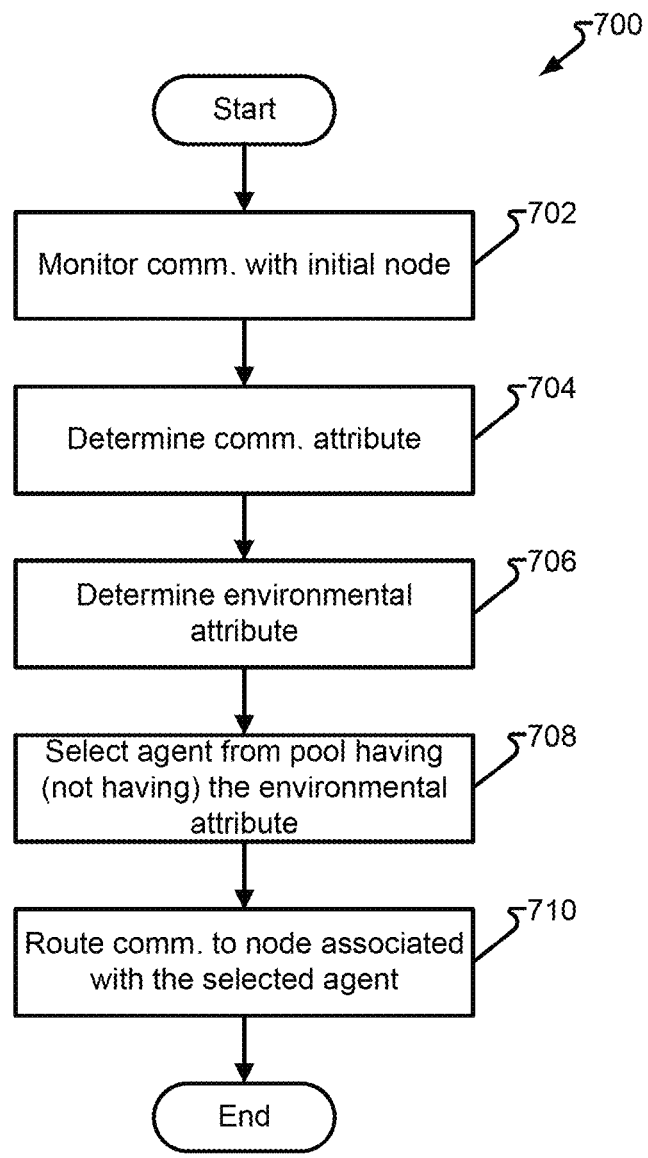
FIG. 7 depicts a process in accordance with embodiments of the present disclosure.

FIG. 7 depicts process 700 in accordance with embodiments of the present disclosure. In one embodiment, step 702 monitors a communication with an initial node of a network, such as customer communication device 108 engaging in an initial communication with automated node 202. The initial communication comprising a cue or selection indicating a communication attribute, such as at least one communication attribute 304 of a record 300, in step 704. In certain embodiments, step 702 may be omitted, such as when information is known about the initial communication from other sources (e.g., number called, email address utilized, communication modality, etc.) that communication attribute 304 may be determined without monitoring the communication. When the communication is monitored, a word or phrase may be matched, such as by a microprocessor of automated node 202 utilizing data storage 204 to access a record matching the word or phrase to a particular purpose and/or communication attribute 304.

Step 706 determines an environmental attribute, such as at least one environmental attribute 404 of record 400, for one or more agents that may be candidates to be connected, via their respective communication node 608/610, to be nodes on a communication with customer communication device 108 for a communication. Step 708 then selects a particular communication node 608/610 of an associated workstation 602 that has (or does not have) the environmental attribute 404 associated with the communication attribute. For example, if the communication attribute 304 is voice call, then routing engine 132 may select an agent at a particular workstation 602 having environmental attribute 404 indicating quite (or sufficiently quiet) or not having noise (or not having a sufficient level of noise). If step 708 determines communication attribute 304 is associated with a resource, such as portable resource 604, then routing engine 132 may select a communication node 608/610 at a particular workstation 602 that has environmental attribute 404 indicating proximity to the resource.

With the agent selected, via selection of a particular communication node 608/610 at a particular location of its respective workstation 602, the communication is routed to the particular communication node 608/610, thereby enabling the communication between a first node, comprising customer communication device 108, and a second node, comprising the selected communication node 608/610.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose microprocessor (e.g., GPU, CPU), or logic circuits programmed with the instructions to perform the methods (e.g., FPGA). In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a network interface to a network;
a microprocessor; and
wherein the microprocessor:
receives a communication attribute associated with a communication, the communication attribute being associated with a purpose of the communication;
receives an agent environmental attribute of a location of a portable resource associated with the communication and required to satisfy the purpose of the communication;
selects an agent from a pool of agents, the selected agent having the agent environmental attribute; and
causes the communication to be routed to a communication device associated with the selected agent.

2. The system of claim 1, further comprising:
a data storage; and
wherein microprocessor, receives the agent environmental attribute from the data storage upon matching at least a portion of the content of the communication to a record of a plurality of records in the data storage and, in response thereto, receives the communication attribute associated with the record.

3. The system of claim 1, further comprising:
a data storage; and
wherein microprocessor, further determines that the agent communication attribute is one of beneficial or detrimental upon accessing a record of a plurality of records in the data storage indicating the agent communication attribute is beneficial or detrimental.

4. The system of claim 1, wherein the agent environmental attribute is one of a real-time environmental attribute currently being observed or a predicted environmental attribute determined from an operation of a component reporting to the network that is anticipated to perform an operation determining the agent environmental attribute.

5. The system of claim 1, wherein the agent environmental attribute is determined by the microprocessor receiving, via the network interface, an output from an environmental sensing component measuring an environmental condition associated with at least one agent of the pool of agents.

6. The system of claim 5, wherein the agent environmental attribute is determined by the microprocessor receiving, via the network interface, a plurality of outputs over time from at least one environmental sensing component, wherein the plurality of outputs is utilized by the microprocessor to predict a subsequent occurrence of the environmental attribute.

7. The system of claim 5, wherein the agent environmental attribute is determined by the microprocessor receiving, via the network interface, an output from the environmental sensing component, comprising detecting the occurrence of a cue known to be a precursor to the occurrence of the agent environmental attribute.

8. The system of claim 5, wherein the agent environmental attribute is determined by the microprocessor receiving, via the network interface, the output from the environmental sensing component a length of time prior to detecting the occurrence of a cue known to be a precursor to the occurrence of the agent environmental attribute.

9. The system of claim 1, wherein the agent environmental attribute comprises a sound level attribute.

10. The system of claim 1, wherein the agent environmental attribute comprises a sound type attribute.

11. The system of claim 1, wherein the portable resource comprises a supervisor required to approve the communication in order to satisfy the purpose of the communication.

12. A method, comprising:
receiving a communication attribute associated with a communication over a network, the communication attribute being associated with a purpose of the communication;
receiving an agent environmental attribute of a location of a portable resource associated with the communication and required to satisfy the purpose of the communication;
selecting an agent from a pool of agents, the selected agent having the agent environmental attribute; and
causing the communication to be routed to a communication device associated with the selected agent.

13. The method of claim 12, receiving the agent environmental attribute further comprises, matching at least a portion of the content of the communication to a record of a plurality of records in the data storage and, in response thereto, receiving the communication attribute associated with the record.

14. The method of claim 12, wherein the agent environmental attribute is one of a real-time environmental attribute currently being observed or a predicted environmental attribute determined from an operation of a component that is anticipated to perform an operation determining the agent environmental attribute.

15. The method of claim 12, wherein the agent environmental attribute is determined by an output from an environmental sensing component measuring an environmental condition associated with at least one agent of the pool of agents.

16. The method of claim 15, wherein the agent environmental attribute is determined by a plurality of outputs over time from at least one environmental sensing component and wherein the plurality of outputs is utilized to predict a subsequent occurrence of the environmental attribute.

17. The method of claim 15, wherein the agent environmental attribute is determined by the output from the environmental sensing component, comprising detecting the occurrence of a cue known to be a precursor to the occurrence of the agent environmental attribute.

18. The method of claim 15, wherein the agent environmental attribute is determined by the output from the environmental sensing component a length of time prior to the detecting the occurrence of a cue known to be a precursor to the occurrence of the agent environmental attribute.

19. The method of claim 15, wherein the agent environmental attribute comprises at least one of a sound level attribute, a sound type attribute, or a resource location attribute of the portable resource associated with communications having the communication attribute.

20. A system, comprising:
means to receive a communication attribute associated with a communication over a network, the communication attribute being associated with a purpose of the communication;
means to receive an agent environmental attribute of a location of a portable resource associated with the communication and required to satisfy the purpose of the communication;
means to select an agent from a pool of agents, the selected agent having the agent environmental attribute; and
means to cause the communication to be routed to a communication device associated with the selected agent.

* * * * *